(12) United States Patent
Venter

(10) Patent No.: US 9,631,967 B2
(45) Date of Patent: Apr. 25, 2017

(54) STRUCTURAL UNIT FOR ARRANGEMENT ON A HYDRAULIC FLUID TANK OF A JET ENGINE

(71) Applicant: Rolls-Royce Deutschland Ltd & Co KG, Blankenfelde-Mahlow (DE)

(72) Inventor: Gideon Venter, Berlin (DE)

(73) Assignee: ROLLS-ROYCE Deutschland LTD & CO KG, Blankenfelde-Mahlow (DE)

( * ) Notice: Subject to any disclaimer, the term of this patent is extended or adjusted under 35 U.S.C. 154(b) by 121 days.

(21) Appl. No.: 14/632,786

(22) Filed: Feb. 26, 2015

(65) Prior Publication Data
US 2015/0260563 A1    Sep. 17, 2015

(30) Foreign Application Priority Data
Mar. 3, 2014  (DE) .................. 10 2014 102 776

(51) Int. Cl.
| | |
|---|---|
| *G01F 23/26* | (2006.01) |
| *F01D 21/00* | (2006.01) |
| *F01D 25/18* | (2006.01) |
| *F02C 7/06* | (2006.01) |
| *F16N 19/00* | (2006.01) |

(52) U.S. Cl.
CPC .......... *G01F 23/263* (2013.01); *F01D 21/003* (2013.01); *F01D 25/18* (2013.01); *F02C 7/06* (2013.01); *F16N 19/003* (2013.01); *G01F 23/26* (2013.01)

(58) Field of Classification Search
CPC ...... G01F 23/26; G01F 23/263; F16N 19/003; F01D 25/18; F01D 21/003; F02C 7/06
USPC .................. 73/304 C, 290 R, 323, 325, 334
See application file for complete search history.

(56) References Cited

U.S. PATENT DOCUMENTS

| | | | | |
|---|---|---|---|---|
| 2,102,615 | A | * 12/1937 | Cubete | G01F 23/686 353/40 |
| 4,440,022 | A | 4/1984 | Masom | |
| 4,671,110 | A | * 6/1987 | de Kock | G01F 23/02 73/304 R |
| 5,351,036 | A | * 9/1994 | Brown | G01F 23/2845 340/618 |

(Continued)

FOREIGN PATENT DOCUMENTS

| | | |
|---|---|---|
| DE | 2634919 | 2/1978 |
| DE | 4323735 | 1/1995 |
| DE | 10 2007 012 917 | 9/2008 |

OTHER PUBLICATIONS

European Search Report dated Aug. 6, 2015 for related Application No. 15157111.4.

(Continued)

*Primary Examiner* — Hezron E Williams
*Assistant Examiner* — Marrit Eyassu
(74) *Attorney, Agent, or Firm* — Shuttleworth & Ingersoll, PLC; Timothy Kuma

(57) ABSTRACT

The present invention proposes a structural unit (21) for arrangement on a hydraulic fluid tank of a jet engine having a vision device (23) and a sensor device (25), which can independently of one another determine a level of a hydraulic fluid present in a hydraulic fluid tank (1) when the structural unit (21) is arranged on a hydraulic fluid tank. A fastening device (27) is provided to fix the structural unit (21) on the hydraulic fluid tank.

20 Claims, 3 Drawing Sheets

(56) References Cited

U.S. PATENT DOCUMENTS

| | | | | |
|---|---|---|---|---|
| 6,988,406 B1* | 1/2006 | Mack | ............ | G01F 23/74 |
| | | | | 73/305 |
| 2008/0066543 A1* | 3/2008 | Sabini | ............ | G01F 23/02 |
| | | | | 73/304 C |
| 2013/0068562 A1* | 3/2013 | Cornet | ............ | F01M 11/12 |
| | | | | 184/6.4 |

OTHER PUBLICATIONS

German Search Report dated Oct. 23, 2014 from counterpart App No. 10 2014 102 776.0.
Bräunling, Willy J. G.: Aircraft Engines , 3 edition, Dordrecht : Springer 2009, pp. 1376 to 1377. ISBN 978-3-540-76368-0.
Bräunling , Willy J. G.: Aircraft Engines , 3 edition, Dordrecht : Springer 2009, pp. 1376 to 1377. ISBN 978-3-540-76368-0.

* cited by examiner

STRUCTURAL UNIT FOR ARRANGEMENT ON A HYDRAULIC FLUID TANK OF A JET ENGINE

This application claims priority to German Patent Application DE102014102776.0 filed Mar. 3, 2014, the entirety of which is incorporated by reference herein.

This invention relates to a structural unit for arrangement on a hydraulic fluid tank of a jet engine having a vision device and a sensor device.

Jet engines are sufficiently known from actual practice, where an oil circuit having an oil tank is provided for oil supply in particular to an accessory gearbox and engine bearings. The oil tank connected to the jet engine is here designed with an inspection glass, using which a level of oil present in the oil tank can be determined by a visual check, for example after opening of an engine cowling. Known oil tanks are furthermore connected to a sensor device or electrical level measuring device arranged inside an interior of the oil tank for determining the oil level, using which a determined oil level can for example be displayed in a cockpit of an aircraft designed with the jet engine.

Due to an offset arrangement of the inspection glass and the sensor device relative to one another inside the oil tank, the measurement results determined in each case with known designs may diverge from one another to an undesirable extent if the oil tank is inclined relative to a horizontal line. A divergence in the measurement results of this type can occur for example due to an inclined arrangement of the oil tank on the jet engine and/or due to an inclination of a ground surface on which an aircraft with a jet engine including the oil tank is located. Under certain circumstances, it may not be possible to meet strict tolerance requirements for the measurement results determined using the inspection glass and the sensor device.

Furthermore, fitting of the inspection glass and the sensor device on the oil tank and calibration of both, inspection glass and sensor device have the disadvantage of being very complex.

The object underlying the present invention is to provide a device by means of which measured value divergences between a sensor device and a vision device are reduced.

It is a particular object to provide a solution to the above problems by a structural unit having features as described herein.

The structural unit in accordance with the present invention for arrangement on a hydraulic fluid tank of a jet engine is designed with a vision device and a sensor device, which can independently of one another determine a level of a hydraulic fluid present in a hydraulic fluid tank when the structural unit is arranged on a hydraulic fluid tank, with a fastening device being provided to fix the structural unit on the hydraulic fluid tank.

The structural unit in accordance with the present invention has the advantage that the vision device, designed in particular as an inspection glass, and the sensor device or electrical level measuring device are in close local proximity to one another due to their common arrangement inside a structural unit, compared with known designs in which the inspection glass and the sensor device are separately assigned to a hydraulic fluid tank. Even when a hydraulic fluid tank provided with the structural unit in accordance with the invention is in a position inclined relative to a horizontal alignment, levels of a hydraulic fluid inside a hydraulic fluid tank determined using the vision device and the sensor device arrangeable in an interior of a hydraulic fluid tank thus diverge only slightly or not at all from one another, so that close tolerances in respect of the measured values determined in each case can advantageously be met.

A further advantage of the structural unit designed in accordance with the present invention is that the vision device and the sensor device can be arranged jointly in a single working step on a hydraulic fluid tank using the sole fastening device. Fitting time and fitting costs are therefore reduced when compared with a known design in which the vision device and the sensor device must be arranged separately on a hydraulic fluid tank. In addition, a hydraulic fluid tank to which the structural unit is to be put into an operative connection can be designed in a simplified form compared with known solutions, since only a single interface must be made available for arrangement of the vision device and the sensor device. Accordingly, a hydraulic fluid tank of this type can be designed lighter and less expensive than known hydraulic fluid tanks.

Due to the structural unit, which is suitable for preassembly, calibration of the vision device and of the sensor device can advantageously be performed even before arrangement of the structural unit on the hydraulic fluid tank, so that calibration of the vision device and of the sensor device after fitting of the structural unit on a hydraulic fluid tank can be dispensed with or performed in a simplified manner. In addition, measuring inaccuracies between the vision device and the sensor device occurring in known designs due to manufacturing tolerances can be largely eliminated using the structural unit in accordance with the invention.

In an advantageous embodiment of the structural unit in accordance with the present invention it is provided that the sensor device for determining the level of the hydraulic fluid is designed as an inductively, capacitively or magnetically measuring sensor device. The sensor device can however in principle be of any design as long as it can be used to determine a level of a hydraulic fluid present in a hydraulic fluid tank.

The sensor device of the structural unit in accordance with the invention can be connected both flexibly and rigidly to the fastening device, so that the sensor device, depending on the application in question and the required functional principle, can be arranged in a simple manner with the structural unit on a hydraulic fluid tank and take up a required position when the structural unit is arranged on a hydraulic fluid tank.

If a longitudinal axis of the sensor device, designed for example cylindrical or tubular, includes an angle, preferably an acute angle, with an outer surface facing away from an interior of the hydraulic fluid tank or with an inner surface of the fastening device facing the interior of the hydraulic fluid tank when the structural unit is arranged on a hydraulic fluid tank, the sensor device can, with an appropriate setting of the angle, be passed in simple manner through a recess of the hydraulic fluid tank during fitting of the structural unit on a hydraulic fluid tank, and additionally be adapted to the spatial conditions prevailing in the area of the hydraulic fluid tank. In addition, this assures in simple manner the required extent of accessibility to the inspection glass.

In an advantageous embodiment of the structural unit in accordance with the present invention it is provided that the vision device has a transparent element, using which a level of a hydraulic fluid present in the hydraulic fluid tank can be directly visually determined in particular by an operator when the structural unit is connected to a hydraulic fluid tank. To that end, a vision device designed as an inspection glass has in particular two openings offset to one another and facing an interior of the hydraulic fluid tank when the structural unit is connected to a hydraulic fluid tank. The openings are connected to one another in the area of the fastening device by an in particular tubular recess, so that hydraulic fluid can flow from one opening to the other. In the state when the structural unit is connected to a hydraulic fluid tank, a hydraulic fluid can flow through the tubular recess according to the principle of communicating vessels. Using the transparent element, made in particular of plastic or glass and arranged on a side of the tubular recess facing away from an interior of the hydraulic fluid tank, a level of the hydraulic fluid can be determined in a simple manner. Alternatively, the vision device can also be designed as a so-called oil gauge window, using which in particular an operator can see directly into an interior of a hydraulic fluid tank, and determine a level of the hydraulic fluid when the structural unit is connected to a hydraulic fluid tank.

In a simple design of the structural unit in accordance with the present invention, the fastening device is designed as a flange.

The vision device and/or the fastening device of an advantageous embodiment of the structural unit in accordance with the present invention is (are) made of a fire-resistant material at least in some areas, depending on the specific application. If the sensor device in its operational state is arranged inside an interior of the hydraulic fluid tank and if for that reason no special requirements in respect of heat resistance are placed on it, the sensor device can be designed at correspondingly low cost without a fire-resistant material of this type.

The features described herein are each suitable, singly or in any combination with one another, to develop the subject matter of the structural unit. The respective feature combinations do not represent any restriction with regard to the development of the subject matter, but have substantially only exemplary character.

Further advantages and advantageous embodiments of the structural unit will become apparent from the present description with reference to the accompanying drawing, where the same reference numerals are used for components of identical design and function for greater clarity.

FIG. 1 shows a hydraulic fluid tank designed as an oil tank 1 in stand-alone position and intended to receive hydraulic fluid, in particular oil. The oil tank 1 is provided for being arranged on a jet engine, in particular in the area of an accessory gearbox arranged in the radial direction of the jet engine and outside a bypass duct of said jet engine.

Figure 1:
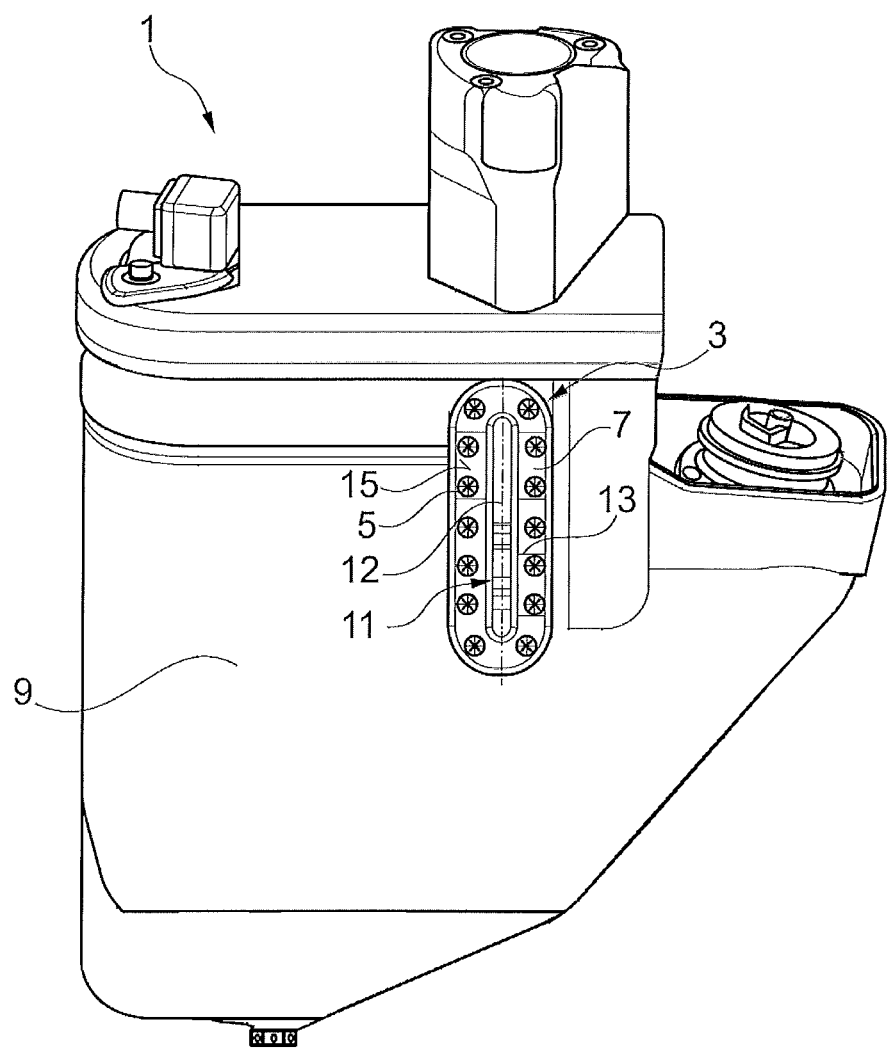
FIG. 1 shows a simplified representation of an oil tank of a jet engine in stand-alone position, where the oil tank is designed with an inventive embodiment of the structural unit.
Figure 2:
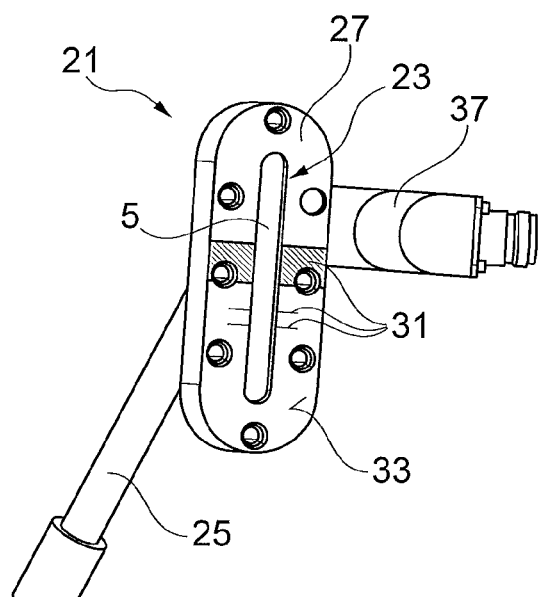
FIGS. 2 to 5 show simplified views of a further embodiment of the structural unit.
Figure 3:
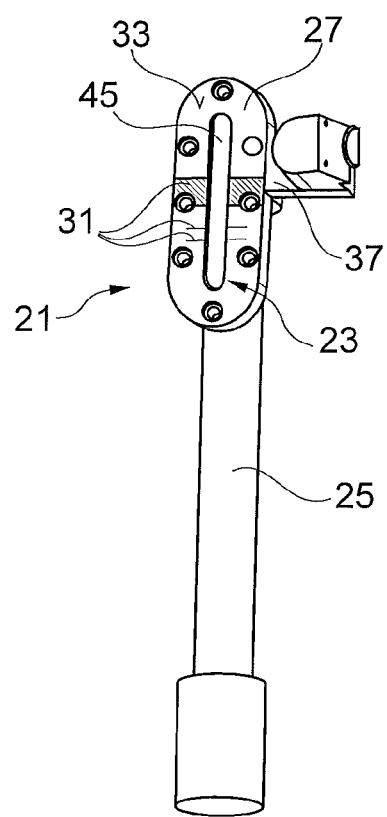

The oil tank 1 is connected here to a structural unit 3 in the area of a recess 5 of the oil tank 1. The structural unit 3 includes a fastening device designed as a flange 7, in the area of which the structural unit 3 is fastened in a simple manner to a wall 9 of the oil tank 1 using several bolts. Furthermore, the structural unit 3 has a vision device designed as an inspection glass 11. In the area of an inspection glass 11, an operator can read off a level of a hydraulic fluid or oil present in an interior of the oil tank 1. The inspection glass 11 is to that end designed with a transparent element 12 and additionally made of fire-resistant material.

For a particularly simple determination of the level in the oil tank 1, markings 13 are provided in the area of a surface 15 of the flange 7 facing away from the interior of the oil tank 1 and next to the transparent element 12 of the inspection glass 11, using which markings a level of the oil can be simply read off by an operator.

FIG. 2 to FIG. 5 each show in stand-alone position a structural unit 21 designed substantially comparable to the structural unit 3 and illustrated in a simplified manner, said unit also having a fastening device designed as a flange 27.

The structural unit 21 is in turn provided with a vision device designed as an inspection glass 23 having markings 31 on an outer surface 33 of the flange 27 and in the area of which a level of the oil tank 1 can be determined. To do so, two openings 39, 41 here substantially at a distance from one another in the vertical direction are provided on an inner surface 43 of the flange 27 facing an interior of the oil tank 1 and shown in FIG. 4. The openings 39, 41 are connected to one another in the area of the flange 27 via a tubular recess not shown in detail, via which oil can flow from one opening 39 or 41 to the other opening 41 or 39 respectively. On a side of the structural unit 21 facing away from the interior of the oil tank 1, the inspection glass 23 has a transparent element 45, made for example of plastic or glass, using which any oil present in the recess can be visually detected by an operator for determining a level of the oil inside the oil tank 1.

Besides the inspection glass 23, the structural unit 21 has a sensor or electrical measuring device 25 which is for example designed with a float or the like and is provided for preferably automated measurement of the level of the oil tank 1. With the sensor device 25 designed here tubular or cylindrical at least in some areas, e.g. a so-called transducer, the level can be determined using various measuring principles, for example inductive, capacitive or magnetic principles. The sensor device 25 is in the present invention rigidly connected to the fastening device designed as a flange 27, via a connecting plate 26, so that the inspection glass 23 can be fixed to the oil tank 1 using the flange 27 together with the sensor device 25 in a single working step.

Figure 4:
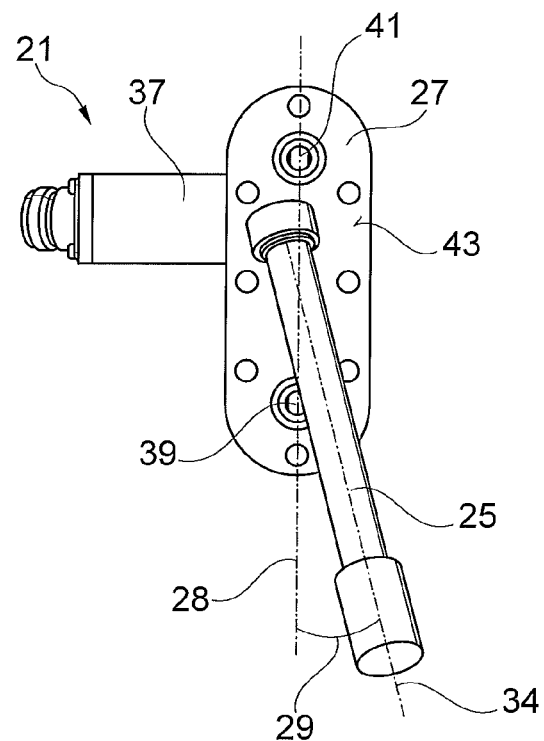
Figure 5:
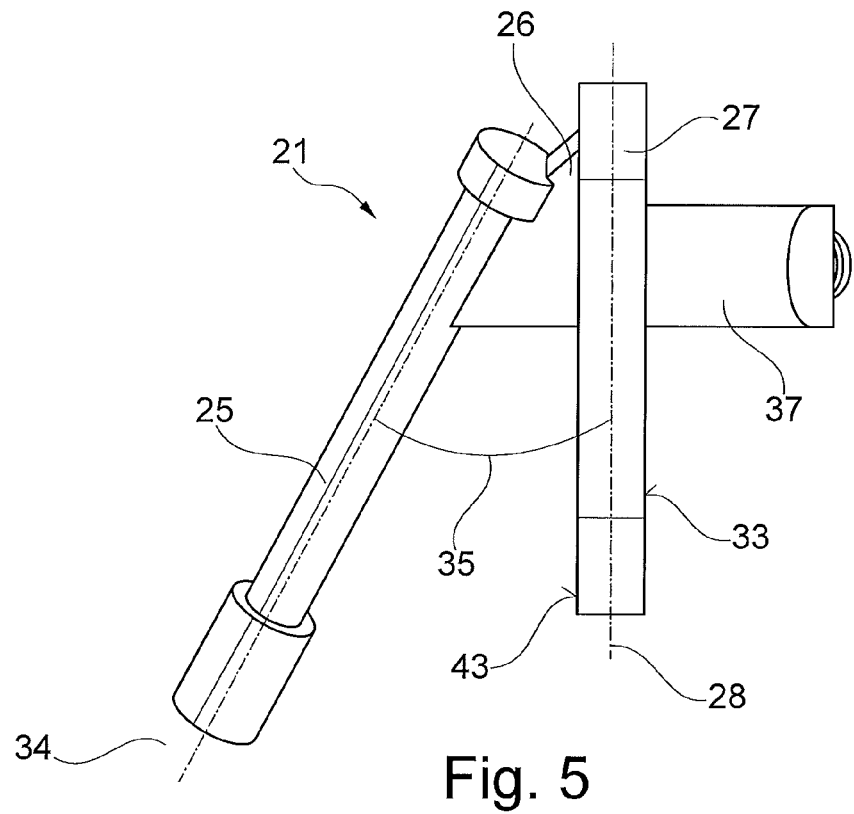

A center axis 34 of the tubular sensor device 25 includes in the present invention an acute angle with an inner surface 43 facing the interior of the oil tank 1 or with the outer surface 33 of the flange 27 extending parallel thereto and facing away from the interior of the oil tank 1, and hence also with a longitudinal center axis 28 of the inspection glass 23. In accordance with FIG. 4, showing a rear view of the flange 27, the center axis 34 of the tubular sensor device 25 also includes an acute angle 29 with the surfaces 33, 43 or with the substantially vertical longitudinal axis 28 of the inspection glass 23. Furthermore the side view of the flange 27 shown in FIG. 5 makes clear that the center axis 34 of the sensor device 25 is also inclined relative to the longitudinal axis 28 of the inspection glass 23 and includes an acute angle 35 with the longitudinal axis 28 of the inspection glass 23.

The inspection glass 23 is in each case arrangeable inclined relative to the flange 27 in such a way that the sensor device 25 can be inserted in a simple manner through the recess 5 of the oil tank 1 into the interior of the oil tank 1, and, in the fitted state, is designed adapted to the installation space respectively available in the oil tank 1, and can be positioned therein.

The structural unit 21 includes furthermore a connection nozzle 37 firmly connected to the flange 27, from which measured values determined in the area of the sensor device 25 can be made available via electric lines for example to a pilot of an aircraft equipped with the jet engine.

The inspection glass 23 and the sensor device 25 are arranged directly adjacent to one another in the structural unit 21 in accordance with the invention, so that measured value divergences between the inspection glass 23 and the sensor device 25 can be prevented or greatly reduced in a simple manner for example in the case of an inclined arrangement of the oil tank 1. Due to the pre-assembly capability of the structural unit 21, calibration of the structural unit 21 can be performed advantageously even before it is fitted on the oil tank 1, thus permitting easy and fast fitting of the structural unit 21 on the oil tank 1.

LIST OF REFERENCE NUMERALS

1 Hydraulic fluid tank, oil tank
3 Structural unit
5 Recess of the oil tank
7 Fastening device, flange
9 Wall of the oil tank
11 Vision device, inspection glass
12 Transparent element
13 Markings
15 Surface of the flange
21 Structural unit
23 Vision device, inspection glass
25 Sensor device
26 Connecting plate
27 Fastening device, flange
28 Longitudinal axis of inspection glass
29 Angle
31 Markings
33 Outer surface of flange
34 Center axis of sensor device
35 Angle
37 Connection nozzle
39, 41 Opening of flange
43 Inner surface of flange
45 Transparent element of inspection glass

What is claimed is:

1. A structural unit for arrangement on a hydraulic fluid tank of a jet engine, comprising:
   a structural unit for arrangement on a hydraulic fluid tank of a jet engine,
   a vision device and a sensor device mounted to the structural unit, which are configured independently of one another to determine a level of a hydraulic fluid present in the hydraulic fluid tank when the structural unit is arranged on the hydraulic fluid tank, the vision device and the sensor device being mounted to the structural unit,
   a fastening device connecting the structural unit to the hydraulic fluid tank,
   wherein the sensor device is mounted internally of the hydraulic fluid tank.

2. The structural unit in accordance with claim 1, wherein the sensor device for determining the level of the hydraulic fluid is an inductively, capacitively or magnetically measuring sensor device.

3. The structural unit in accordance with claim 2, wherein the sensor device is connected flexibly to the fastening device.

4. The structural unit in accordance with claim 3, wherein a longitudinal axis of the sensor device includes an angle with an outer surface facing away from an interior of the hydraulic fluid tank or with an inner surface of the fastening device facing the interior of the hydraulic fluid tank when the structural unit is arranged on a hydraulic fluid tank.

5. The structural unit in accordance with claim 4, wherein the vision device includes a transparent element by which a level of a hydraulic fluid present in the hydraulic fluid tank can be directly visually determined when the structural unit is connected to the hydraulic fluid tank.

6. The structural unit in accordance with claim 3, wherein the vision device includes a transparent element by which a level of a hydraulic fluid present in the hydraulic fluid tank can be directly visually determined when the structural unit is connected to the hydraulic fluid tank.

7. The structural unit in accordance with claim 2, wherein the sensor device is connected rigidly to the fastening device.

8. The structural unit in accordance with claim 7, wherein a longitudinal axis of the sensor device includes an angle with an outer surface facing away from an interior of the hydraulic fluid tank or with an inner surface of the fastening device facing the interior of the hydraulic fluid tank when the structural unit is arranged on a hydraulic fluid tank.

9. The structural unit in accordance with claim 8, wherein the vision device includes a transparent element by which a level of a hydraulic fluid present in the hydraulic fluid tank can be directly visually determined when the structural unit is connected to the hydraulic fluid tank.

10. The structural unit in accordance with claim 7, wherein the vision device includes a transparent element by which a level of a hydraulic fluid present in the hydraulic fluid tank can be directly visually determined when the structural unit is connected to the hydraulic fluid tank.

11. The structural unit in accordance with claim 2, wherein a longitudinal axis of the sensor device includes an angle with an outer surface facing away from an interior of the hydraulic fluid tank or with an inner surface of the fastening device facing the interior of the hydraulic fluid tank when the structural unit is arranged on a hydraulic fluid tank.

12. The structural unit in accordance with claim 11, wherein the vision device includes a transparent element by which a level of a hydraulic fluid present in the hydraulic fluid tank can be directly visually determined when the structural unit is connected to the hydraulic fluid tank.

13. The structural unit in accordance with claim 2, wherein the vision device includes a transparent element by which a level of a hydraulic fluid present in the hydraulic fluid tank can be directly visually determined when the structural unit is connected to the hydraulic fluid tank.

14. The structural unit in accordance with claim 1, wherein a longitudinal axis of the sensor device includes an angle with an outer surface facing away from an interior of the hydraulic fluid tank or with an inner surface of the fastening device facing the interior of the hydraulic fluid tank when the structural unit is arranged on a hydraulic fluid tank.

15. The structural unit in accordance with claim 14, wherein the vision device includes a transparent element by which a level of a hydraulic fluid present in the hydraulic fluid tank can be directly visually determined when the structural unit is connected to the hydraulic fluid tank.

16. The structural unit in accordance with claim 1, wherein the fastening device is a flange.

17. The structural unit in accordance with claim 1, wherein the vision device is made of fire-resistant material.

18. The structural unit in accordance with claim 1, wherein the sensor device is connected flexibly to the fastening device.

19. The structural unit in accordance with claim 1, wherein the sensor device is connected rigidly to the fastening device.

20. The structural unit in accordance with claim 1, wherein the vision device includes a transparent element by which a level of a hydraulic fluid present in the hydraulic fluid tank can be directly visually determined when the structural unit is connected to the hydraulic fluid tank.

* * * * *